United States Patent [19]
Delaney et al.

[11] 3,902,105
[45] Aug. 26, 1975

[54] THYRISTOR MOTOR CONTROL CIRCUIT

[75] Inventors: Michael J. Delaney, Greene; John W. Ames, Whitney Point, both of N.Y.

[73] Assignee: The Raymond Corporation, Greene, N.Y.

[22] Filed: Dec. 26, 1973

[21] Appl. No.: 430,917

[52] U.S. Cl. .............................. 318/341; 318/139
[51] Int. Cl. ............................................. H02h 7/08
[58] Field of Search .......... 318/272, 277, 306, 308, 318/341, 345, 391, 392, 400, 415, 416, 445, 446, 452, 453, 484

[56] References Cited
UNITED STATES PATENTS

| | | |
|---|---|---|
| 3,484,652 | 12/1969 | Thiele .............................. 318/341 X |
| 3,551,773 | 12/1970 | Dannettell et al. .................. 318/341 |
| 3,551,774 | 12/1970 | Rusch ................................. 318/341 |
| 3,562,617 | 2/1971 | Meier et al. ........................ 318/341 |

Primary Examiner—B. Dobeck
Assistant Examiner—W. E. Duncanson, Jr.
Attorney, Agent, or Firm—Richard G. Stephens

[57] ABSTRACT

In a thyristor speed control system for a battery-powered traction motor, motor operation is prevented if the thyristor is shorted or by-pass contacts in parallel with the thyristor are welded closed, and operation of the by-pass contacts is prevented if the thyristor is failed open.

17 Claims, 1 Drawing Figure

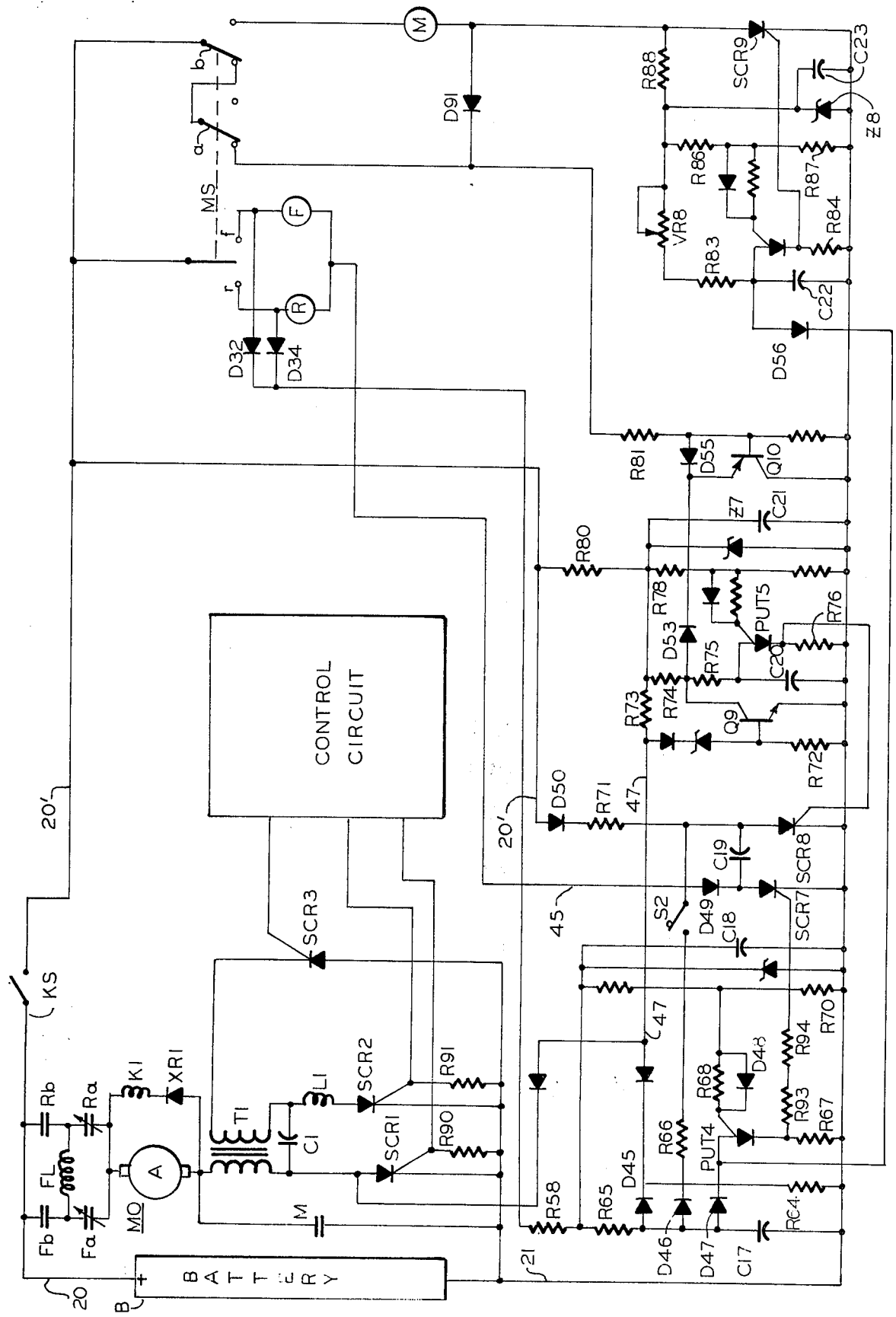

THYRISTOR MOTOR CONTROL CIRCUIT

This invention relates to thyristor speed control circuits for battery-powered traction motors such as those used on lift trucks, and more particularly to an improved circuit incorporating novel safety features. Speed control of a direct-current series-field traction motor by variation of the duty cycle of one or more thyristors which apply battery power to the motor is well known. High speed travel frequently requires that the motor receive more current than the thyristor circuit can continuously carry, and to avoid overheating the thyristors during sustained high speed travel it is common to provide a contractor which may close to bypass the thyristor circuit when the operator moves a control handle to an extreme position to command high speed travel. The damage and injury which an uncontrolled truck may cause makes it extremely important that a number of potential circuit failures be effectively detected and that truck operation be prevented or halted upon occurrence of such failures. It is vitally necessary that truck operation be prevented, or halted if operation is underway, if the main thyristor becomes shorted, or otherwise battery power will be applied continuously to the motor, causing maximum acceleration, which may be dangerous. Detection of a shorted main thyristor and provision of an effective system to prevent operation upon the occurrence of such a failure is complicated not only by the fact that the thyristor appears to be a virtual electrical short each time it is turned on, but also by the fact that closure of the mentioned by-pass contactor in parallel with the thyristor will falsely signal a thyristor short, unless the thyristor is switched out of the motor circuit at the time by-pass contactor is closed, and the provision of heavy current contactor solely to switch out the thyristor for such a purpose is economically disadvantageous. One object of the present invention is to provide an improved arrangement which rapidly and reliably detects a shorting of the main thyristor and disables the motor when the motor speed is being controlled by the main thyristor, but which does not disable the motor when closure of the by-pass contractor for intentional high speed travel makes the thyristor appear to be shorted.

Detection of a shorted main thyristor advantageously may be combined with detection of a failure of the main thyristor to be turned off for any reason. If the main thyristor fails to a continuously shorted condition, safety dictates that the truck be turned off, but failure of the main thyristor to be turned off sometimes occurs only momentarily, and added convenience of operation can be achieved if operation can be automatically resumed following a momentary failure. In accordance with another feature of the invention, a motor which is disabled because lack of thyristor commutation has been detected may be automatically re-enabled, to be disabled again if lack of commutation persists, but to proceed in normal fashion if commutation occurs in normal fashion.

If the by-pass contactor of a thyristor motor system fails, so that its contacts are closed when its coil is not energized, it is vitally necessary that the operator be prevented from operating the truck, or else extreme acceleration might occur from a dead stop. Also, if the heavy currents which flow during high speed travel should cause the contacts of the by-pass contactor to become welded shut, it is vitally necessary that truck operation be halted as soon as the operator moves his speed control back from the high speed position, or else the high speed of the truck cannot be reduced. Another object of the invention is to provide an improved arrangement which will prevent or disable motor operation if the by-pass contactor fails closed.

When various prior art systems are started, the presence of a shorted main thyristor or welded by-pass contactor will be detected shortly after current is applied to the motor and a directional contactor will be opened to disable the motor. Though such will prevent sustained operation in the presence of either of those circuit defects, they suffer from the disadvantages that the vehicle may receive a large current pulse causing it to lurch, and then the directional contactor will be opened while carrying a very heavy current. An important object of the present invention is to overcome those disadvantages, by provision of a system which prevents any closure of the directional contactor in the presence of such a defect rather than allowing momentary closure of the contactor.

To insure that the operator cannot cause a dangerously large acceleration from a dead stop, it is desirable that closure of the by-pass contactor be possible only after the truck has been gradually accelerated under thyristor speed control, and to provide such operation it has been known that energization of the by-pass contactor may be accomplished only with a predetermined time delay after the control handle is moved to the high speed travel position. However, mere use of such a time delay does not adequately foreclose the possibility of an extreme acceleration from a dead stop, since the by-pass contactor still might close after the delay and cause the extreme acceleration if the thyristor circuit had not accelerated the motor during the delay period, a condition which could occur if the thyristor were to have failed open, for example, or if any defect in the thyristor control circuits results in the main thyristor not turning on. Another object of the invention is to provide an improved circuit in which operation of the by-pass contactor occurs with a time delay after movement of the control handle to the high speed position, but wherein such operation is prevented if the main thyristor has failed open or otherwise fails to be turned on, and an ancillary object is to provide such control of the by-pass contactor in a simple manner without any need to measure motor current in order to effect reliable by-pass contactor control.

Other objects of the invention will in part be obvious and will in part appear hereinafter.

The invention accordingly comprises the features of construction, combination of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawing, in which the single FIGURE is a schematic diagram illustrating an exemplary embodiment of the invention.

Turning now to the schematic diagram, the positive and negative terminals of battery B are connected to lines 20, and 21, respectively. The direction of motor MO is determined by switching the direction of field current, by selective energization of the coil of forward directional contactor F to operate contacts Fa and Fb, or energization of the coil of the reverse directional contactor R to operate contacts Ra and Rb, the selection of which contactor is energized being controlled by closure of contact f or contact r of the operator's manual control MS. Contact f or contact r is arranged to close whenever the operator moves his control handle slightly in one direction or the other from a center or neutral position.

Assuming forward contactor F is energized, current flows from the battery through the motor field FL and armature A as soon as main thyristor SCR1 is turned on by application of a positive turn-on pulse to its gate lead from a pulse generating control circuit which may be completely conventional and which is shown as a simple block. A positive turn-on pulse is simultaneously applied to turn on thyristor SCR3 to provide charging of a commutating capacitor C1. Approximately one or a few milliseconds after the turn-on pulse, the control circuit applies a pulse to turn on commutating thyristor SCR2, thereby to turn off main thyristor SCR1 and interrupt the application of battery power to the motor. Then the occurrence of further turn-on pulses, each followed by a turn-off pulse, causes the cycle to be repeated. The time average current through the motor depends upon the repetition rate of the turn-on pulses, and upon the interval after each turn-on pulse before the succeeding turn-off pulse occurs. An operator's speed control potentiometer (not shown) linked to manual control MS may vary the pulse rate and pulse interval in conventional fashion. The contacts labelled M of a high-speed by-pass contactor, the coil of which is also designated M, are shown by-passing main thyristor SCR1, so that closure of the by-pass contacts allows high speed travel at higher currents than can be continuously provided by thyristor SCR1. The operator energizes the by-pass contactor M by moving his manual control MS to an extreme or limit position so as to translate contacts a and b from the positions shown.

Operation in one direction is identical in principle to operation in the other direction, and only operation in the forward direction will be explained for sake of brevity. Assuming the operator moves control MS slightly from center to close contact f for forward travel, positive voltage will be applied from positive control voltage bus 20' via contact f, the coil of contactor F and diode D49 to the anode of SCR7, and it will be apparent that contactor F then will not be energized until SCR7 is turned on. SCR7 is turned on after a brief time delay governed by a relaxation oscillator timing circuit which includes capacitor C17 and programmable unijunction transistor PUT4. Closure of contact f also applies voltage through diodes D32 and D34 and resistors R58 and R65 to charge capacitor C17. Diode D45 then will be cut off because of the positive voltage applied to D45 from terminal 47 through diode D51, and diode D46 will be cut off because of the positive voltage applied to it via diode D50 and resistors R71 and R66, assuming switch S2 is closed. When the voltage across capacitor C17 reaches a level determined by the R58, R69, R70 voltage divider, unijunction transistor PUT4 fires, and capacitor C17 discharges through diode D47, PUT4 and resistor R67. The rise of the PUT4 cathode is coupled to the SCR7 gate via resistors R93 and R94, thereby causing turn-on of SCR7, energization of the forward directional contactor F, and hence energization of the motor. In typical applications the time period during which capacitor C17 charges before SCR7 fires is arranged to be of the order of 0.1 second.

It may be seen that terminal 47 is connected via diode D36 to the anode of main SCR1. The periodic firing of main thyristor SCR1, so that its anode voltage periodically drops to near ground potential then periodically grounds terminal 47 through diode D36, thereby lowering the voltage applied via diode D51 to diode D45, to a value below the firing potential of PUT4. Thus once the directional contactor closes and pulses of current turn main SCR1 on and off, the flow of current through diode D45 and resistor R64 each time the main SCR is turned on will prevent capacitor C17 from charging up to fire PUT4 again, during normal operating conditions. Later, whenever the operator opens the master switch contact f to interrupt the current through coil F, SCR7 will be turned off, and any voltage on capacitor C17 will discharge through diode D45 and resistor R64.

If main SCR1 is shorted, or if the contacts of the by-pass contactor M are failed closed, it will be seen that diode D36 will conduct and maintain terminal 47 near ground potential, cutting off the bias which diode D51 otherwise would apply to cut off diode D45, and hence either of those fault conditions prevents C17 from charging to fire PUT4 to energize a directional contactor. Thus, unlike prior systems in which a main SCR short or welded by-pass contactor will allow momentary closure of a directional contactor, a lurching of the truck, and then opening of the directional contactor under heavy current conditions, the present invention advantageously prevents any directional contactor closure whatever in the presence of such circuit defects. If rather than being shorted the main SCR1 is failed open, it will be seen that terminal 47 will remain at a high positive value. In such an event capacitor C17 will charge and fire PUT4 repeatedly. The first firing of PUT4 will turn on SCR7 and energize a directional contactor, but the open condition of the main thyristor will prevent motor operation. While the repeated firing of PUT4 will have no effect on SCR7, which will remain turned on, such repeated firing is used to provide a further important safety feature, as will be seen below.

During normal operation each time turn-on of main thyristor SCR1 lowers the voltage at terminal 47, that operates to cut off transistor Q9, which allows capacitor C20 to charge through resistors R74 and R75. During normal operation the SCR1 anode will rise in a few milliseconds as that thyristor is commutated, turning on Q9 to discharge C20. However, if the main SCR1 fails shorted, or is not commutated for any reason within a predetermined time, capacitor C20 will charge sufficiently to fire unijunction PUT5 and turn on thyristor SCR8. In typical applications the period of the C20, PUT5 timing circuit may be of the order of 0.1 second. The firing of SCR8 applies a negative-going pulse through capacitor C19 to turn off SCR7, thereby dropping out the directional contactor and preventing further operation of the vehicle.

The firing of SCR8 under such circumstances will be seen also to ground the top of capacitor C17 through diode D46, resistor R66 and SCR8, assuming switch S2 is closed, thereby preventing PUT4 from re-firing SCR7 to re-close a directional contactor. The operator then must momentarily operate his key switch KS to remove control voltage, and thereby turn off SCR8, before motor operation can be resumed. Various auxiliary equipments, such as a lift pump drive motor (not shown), are commonly also powered from line 20' so that opening of the key switch KS interrupts the operation of such equipments. It is desirable in some applications that momentary opening of the key switch not be required after SCR8 has fired in order to resume operation, in order that the operation of the auxiliary equipment not be interrupted, particularly if the fault which caused lack of commutation of the main SCR1 is only a momentary one. Occasional or momentary lack of commutation may occur in various systems in the absence of any component failure, particularly if a large excess of commutating capacity is not provided, and economy often dictates that an excessive amount of commutating capacity not be required. Electrical noise also may result in occasional lack of commutation of the main SCR1, in the absence of any component failure. The provision of switch S2 allows the operator to determine whether or not key switch KS has to be momentarily opened to resume operation after SCR8 has been fired due to lack of commutation of SCR1. Assuming that switch S2 is set to an open position, then whenever SCR8 fires to drop out the directional contactor, it will be seen that capacitor C17 can charge up to fire PUT4 and SCR7 to re-close the contactors, with a desired time delay, typically of the order of 0.1 second. If the fault which caused lack of commutation persists, SCR8 will promptly operate again to open the directional contactor, capacitor C17 will re-charge to fire PUT4 and SCR7 to re-close the directional contactor, and successive openings and closings of the directional contactor will rapidly occur, so that the clattering of the contactor will provide an audible signal to inform the operator to open key switch KS to shut off the system, but if the loss of commutation was only momentary, SCR8 will not be re-fired after SCR7 has fired to re-close the directional contactor and normal operations then will continue without any need to open switch KS to shut off the vehicle. In applications where operator selection between key-switch reset and automatic reset modes is deemed unnecessary, it will be seen that switch S2 may be omitted, being replaced by a short in cases where key-switch reset is desired, and with diode D46, resistor R66 and switch S2 all omitted, in cases where automatic reset is desired.

To avoid the dangerously large acceleration which otherwise could occur if the M by-pass contactor could be rapidly closed with the truck stopped, the M contactor is arranged to close only a predetermined time, of the order of 2 to 4 seconds, after the control MS is moved to the high speed travel position. When control MS is moved far enough to translate its contacts a and b, it will be seen that contact b applies voltage through the M contactor coil to a time delay circuit which includes unijunction PUT6 and thyristor SCR9. The current passing through variable resistor VR8 and resistor R83 charges capacitor C22, and when the voltage across C22 reaches a level determined by the R86, R87 voltage divider, PUT6 fires and turns on SCR9, thereby energizing the M by-pass contactor. The turn on of SCR9 also grounds resistor R88, preventing any recharging of C22 to re-fire PUT6. It will be apparent that the length of the delay before the M contactor is energized may be varied by adjustment of resistor VR8.

When the M contactor coil is energized, its contacts in the main motor circuit will be seen to ground the anode of main SCR1, just as if SCR1 has failed shorted, a condition under which SCR8 is normally operated to drop out the directional contactor and disable the motor, as previously explained. In order to prevent SCR8 from firing when the M by-pass contactor is closed, contact a of switch MS is arranged to apply voltage to hold transistor Q10 off during thyristor speed control. When the control switch MS is first moved to close the M contactor, voltage is applied from contact b through the coil of the M contactor, diode D91 and resistor R81 to continue to maintain transistor Q10 cut off, but when SCR9 fires to energize the M contactor coil, the current through diode D91 will be interrupted, allowing transistor Q10 to turn on. Turning on transistor Q10 will be seen to ground capacitor C20 through diode D53 and resistor R75, thereby preventing C20 from charging up enough to fire PUT5 and SCR8.

If the contacts of the by-pass contactor M are failed closed, it is vitally important that the truck not be started. Since the by-pass contacts would then appear as a short across main SCR1, the lowering of terminal 47 allows diode D46 to prevent C17 from charging, preventing any directional contactor closure, as previously explained. It is also vitally important that truck operation be halted if the by-pass contacts become welded closed during high speed travel. In such a case the fact that those contacts become welded is not detected at the instant they become welded, since they are then closed together anyway, but as the operator returns the control handle toward center from the high-speed travel position, the cutoff of SCR9 from the opening of the b contact applies voltage via diode D91 to turn Q10 off, the subsequent closing of the a contact holds transistor Q10 off, and if the by-pass contacts remain closed, the lowered voltage at terminal 47 then allows charging of capacitor C20 to fire PUT5 and SCR8, thereby opening the directional contactor to de-energize the motor.

It is vitally important that operation of the by-pass contactor M be prevented if the main SCR1 is failed open. Otherwise the operator would receive no motor operation as he advanced the control handle through the thyristor speed control range, but then the truck would receive a sudden extreme acceleration from a dead stop as the M contactor closed. While the diode D36 connection will prevent directional contactor closure if SCR1 is failed closed or shorted, it will not do so if SCR1 is failed open. It will be recalled that PUT4 is prevented from firing more than once as normal operation begins because the lowering of the SCR1 anode each time SCR1 fires cuts off D51, allowing C17 to discharge through diode D45 and resistor R64, maintaining the C17 voltage at a value below the firing level of PUT4. If the main SCR1 fails open, or if a defect in the control circuit prevents SCR1 from being turned on, the voltage at terminal 47 remains high, cutting off diode D45, so that capacitor C17 can charge repeatedly and fire PUT4 repeatedly, in relaxation oscillator fashion. Each time PUT4 fires it grounds capacitor C22 through diode D56 and PUT4, thereby preventing C22 from charging up to fire PUT6 and SCR9 to energize the by-pass contactor M.

Various zener diode-capacitor combinations shown in the drawing perform the function of power supply voltage regulation in accordance with known principles. Known forms of protective circuits connected across the contactor coils to protect components from inductive transients have been omitted from the drawing.

A variety of changes from the specific system shown will occur to those skilled in the art after a perusal of this disclosure. While the circuit is shown employing contactors for a single motor, it will be apparent that the circuit could instead control plural contactors for plural motors.

It will thus be seen that the objects set forth above, among those made apparent from the preceding description, are efficiently attained, and since certain changes may be made in the above construction without departing from the scope of the invention, it is intended that all matter contained in the above description or shown in the accompanying drawing shall be interpreted as illustrative and not in a limiting sense.

The embodiments of the invention in which an exclusive property or privilege is claimed are defined as follows:

1. A control system for an electric traction motor of a battery-powered vehicle, comprising, in combination: a first thyristor connected in series with said motor and contacts of a first contactor means across a battery; means for controlling the duty cycle of said first thyristor; first timing circuit means responsive to a first enabling signal and operative to provide an output pulse after a predetermined time delay; operator-controlled switch means for connecting an operating coil of said first contactor means in series with a second thyristor across said battery and for applying said first enabling signal to said first timing circuit, said output pulse from said first timing circuit being connected to turn on said second thyristor; and detection circuit means connected between said first thyristor and said first timing circuit for preventing said timing circuit from responding to said enabling signal if said first thyristor is shorted.

2. A system according to claim 1 wherein said first timing circuit comprises a capacitor charging circuit connected to fire a unijunction transistor to provide said output pulse, and wherein said detection means comprises diode means connected to divert said enabling signal to prevent capacitor charging if said first thyristor is shorted.

3. A system according to claim 1 having a relaxation oscillator connected to fire a third thyristor to turn off said second thyristor, and means responsive to said detection means for enabling said oscillator while said first thyristor is turned on and for resetting said oscillator as said first thyristor is turned off, whereby said oscillator is prevented from firing said third thyristor each time said first thyristor is turned off within a predetermined time after being turned on.

4. A system according to claim 1 wherein said first timing circuit means comprises a capacitor having a first terminal connected to one terminal of said battery and a second terminal connected to receive said first enabling signal, one terminal of said first thyristor being connected to said one terminal of said battery, and wherein said detection circuit means comprises resistance means connected to said capacitor through a first diode to discharge said capacitor upon conduction of said first diode, second diode means normally biasing said first diode to conduction, and a third diode connected between said second diode and a second terminal of said first thyristor to cut off said first diode when said first thyristor is conductive.

5. A system according to claim 1 having means responsive to conduction of said first thyristor for turning off said second thyristor if a conduction period of said first thyristor exceeds a predetermined duration, and in which said first timing circuit means may provide a further output pulse to re-fire said second thyristor to re-energize said operating coil.

6. A system according to claim 2 having normally-open contacts of a by-pass contactor connected to by-pass said first thyristor; a second timing circuit responsive to a second enabling signal and operative to provide an output pulse after a predetermined time delay; said operator-controlled switch means being operable to connect the operating coil of said by-pass contactor in series with a third thyristor across said battery and to apply a second enabling signal to said second timing circuit; and wherein said detection circuit means is connected to allow said capacitor charging circuit to repetitively charge and fire said unijunction transistor if said first thyristor is failed open; and means responsive to firing of said unijunction transistor for preventing said second enabling signal from enabling said second timing circuit.

7. A system according to claim 3 having means responsive to a predetermined position of said operator-controlled switch means for energizing a by-pass contactor to by-pass said first thyristor, and means responsive to movement of said switch means to said predetermined position for disabling said oscillator.

8. A system according to claim 3 having circuit means interconnecting said third thyristor and said first timing circuit means whereby firing of said third thyristor disables said first timing circuit means and prevents said second thyristor from being turned on.

9. A system according to claim 8 wherein said circuit means includes switch means interconnecting said third thyristor and said first timing circuit means, said switch means being operable between a first position in which firing of said third thyristor disables said first timing circuit means to prevent said second thyristor from being turned on, and a second position in which after said third thyristor has been turned on said first timing circuit means may re-fire said second thyristor to re-energize said operating coil of said first contactor means and turn off said third thyristor.

10. A control system for an electric traction motor of a battery-powered vehicle, comprising, in combination: a first thyristor connected in series with said motor and contacts of a first contactor means across a battery; means for controlling the duty cycle of said first thyristor; cyclically-operable first timing circuit means responsive to a first enabling signal and operative to provide an output pulse after a predetermined time delay; operator-controlled switch means for connecting an operating coil of said first contactor means in series with a second thyristor across said battery and for applying said first enabling signal to said first timing circuit, said output pulse from said first timing circuit being connected to turn on said second thyristor; and means responsive to conduction of said first thyristor for preventing said first timing circuit from providing output pulses, whereby said operating coil of said first contactor will not be energized if said first thyristor is shorted, said first timing circuit means will provide one output pulse to fire said second thyristor if said first thyristor is operable and turns on and off, and said first timing circuit means will provide repeated output pulses if said first thyristor is failed open.

11. A control system according to claim 10 having normally-open contacts of a by-pass contactor connected to by-pass said first thyristor, a second timing circuit normally operable after receipt of a second enabling signal from said operator-controlled switch means to energize the operating coil of said by-pass contactor, and means responsive to said repeated output pulses for preventing operation of said second timing circuit.

12. A control system for an electric traction motor of a battery-powered vehicle, comprising, in combination: electronic switching means connected in series with said motor across a battery; pulse generating means for controlling the duty cycle of said electronic switching means; an operator speed control; control means adjustable over a range of operation of said operator speed control for controlling said pulse generating means; a by-pass contactor means having an operating coil and having a pair of normally-open contacts connected in parallel with said electronic switching means; a first timing circuit means normally operable after receipt of a first enabling signal for a predetermined time to energize said operating coil of said by-pass contactor means to close said normally-open contacts; switch means operated by said operator speed control for applying said first enabling signal to said first timing circuit means when said operator speed control is adjusted to a predetermined position; and circuit means responsive to non-conduction of said electronic switching means for preventing said first timing circuit means from energizing said operating coil.

13. A system according to claim 12 wherein said first timing circuit means comprises an RC charging circuit connected to be charged by said first enabling signal, thyristor means connected in series with said operating coil across said battery, and means responsive to a predetermined charge level in said RC charging circuit for turning on said thyristor means to energize said operating coil, and wherein said circuit means comprises means operable upon non-conduction of said electronic switching means to discharge said charging circuit.

14. A system according to claim 12 in which said switch means is connected to apply said first enabling signal to said first timing circuit means through said operating coil, said first enabling signal being of insufficient magnitude to cause said operating coil to close said normally-open contacts.

15. A system according to claim 12 having contacts of a directional contactor means connected in series with said motor and said electronic switching means, and wherein said circuit means comprises a second timing circuit operable to energize an operating coil of said directional contactor means.

16. A system according to claim 15 wherein said second timing circuit comprises a relaxation oscillator circuit operable during oscillation to prevent said first timing circuit from energizing said operating coil of said by-pass contactor means, and means responsive to conduction of said electronic switching means for preventing oscillation of said oscillator circuit.

17. In a control system for an electric traction motor of a battery-powered lift truck having electronic switching means and contacts of a directional contactor connected in series with said motor across a battery, and means for controlling the duty cycle of said electronic switching means, the combination of: a relaxation oscillator timing circuit operable after receipt of an enabling signal for a predetermined time to discharge and close a first electronic switch to energize an operating coil of said directional contactor, means responsive to conduction of said electronic switching means for preventing said enabling signal from reoperating said oscillator timing circuit, means responsive to conduction of said electronic switching means for a predetermined time interval for closing a second electronic switch, said first and second electronic switches being interconnected so that closure of one opens the other, whereby a system fault which causes said electronic switching means to conduct for said predetermined time each time it is caused to conduct will cause said directional contactor to be repeatedly opened and closed, thereby providing an audible signal to warn an operator of the presence of said fault, and whereby eventual disappearance of said fault while said motor is operating will terminate the repeated opening of said directional contactor and allow said motor to continue to operate without stopping.

* * * * *